United States Patent
Mairhofer

(10) Patent No.: US 11,480,453 B2
(45) Date of Patent: Oct. 25, 2022

(54) TURBINE WHEEL METER

(71) Applicant: BWT Holding GmbH, Mondsee (AT)

(72) Inventor: Anton Mairhofer, Zell am Moos (AT)

(73) Assignee: BWT Holding GmbH, Mondsee (AT)

(\*) Notice: Subject to any disclaimer, the term of this patent is extended or adjusted under 35 U.S.C. 154(b) by 0 days.

(21) Appl. No.: 17/048,591

(22) PCT Filed: Apr. 18, 2019

(86) PCT No.: PCT/EP2019/060208
§ 371 (c)(1),
(2) Date: Oct. 17, 2020

(87) PCT Pub. No.: WO2019/202134
PCT Pub. Date: Oct. 24, 2019

(65) Prior Publication Data
US 2021/0156720 A1    May 27, 2021

(30) Foreign Application Priority Data

Apr. 18, 2018 (EP) .................................... 18168097

(51) Int. Cl.
*G01F 1/075* (2006.01)
*G01F 1/08* (2006.01)
*G01F 1/06* (2006.01)

(52) U.S. Cl.
CPC ............... *G01F 1/075* (2013.01); *G01F 1/06* (2013.01); *G01F 1/08* (2013.01)

(58) Field of Classification Search
CPC ............... G01F 1/075; G01F 1/08; G01F 1/06
See application file for complete search history.

(56) References Cited

U.S. PATENT DOCUMENTS

| 1,713,977 | A | | 5/1929 | Moody | |
|---|---|---|---|---|---|
| 4,489,616 | A | * | 12/1984 | Priddy | ...................... G01F 1/06 73/861.79 |
| 2014/0165719 | A1 | * | 6/2014 | Williamson | .............. G01F 1/06 73/272 R |
| 2018/0156060 | A1 | * | 6/2018 | Martinez-Botas | ........ F01D 5/24 |

FOREIGN PATENT DOCUMENTS

| DE | 466300 C | 10/1928 |
|---|---|---|
| DE | 669520 C | 12/1938 |
| DE | 102014017372 A1 | 5/2016 |
| EP | 0512325 A2 | 11/1992 |
| GB | 529615 A | 11/1940 |
| JP | 2002039817 A | 2/2002 |

\* cited by examiner

*Primary Examiner* — Randy W Gibson
*Assistant Examiner* — John M Royston
(74) *Attorney, Agent, or Firm* — Smartpat PLC

(57) ABSTRACT

A turbine wheel meter for measuring the flow rate of a liquid, in particular water, is disclosed, with a measuring device, with an inlet and an outlet for the liquid to be measured, with a flow channel provided between the inlet and outlet, and with a turbine that has a turbine wheel with curved blades positioned in the flow channel, and wherein the turbine wheel cooperates with the measuring device to measure the flow rate of the liquid. A lower pressure loss and a high measurement sensitivity are achieved by embodying the turbine as a radial turbine with single-curved blades on the turbine wheel.

15 Claims, 7 Drawing Sheets

TURBINE WHEEL METER

FIELD OF THE INVENTION

The invention relates to a turbine wheel meter for measuring the flow rate of a liquid, in particular water, with a measuring device, with an inlet and an outlet for the liquid to be measured, with a flow channel provided between the inlet and outlet, and with a turbine that has a turbine wheel with curved blades positioned in the flow channel, and wherein the turbine wheel cooperates with the measuring device to measure the flow rate of the liquid.

DESCRIPTION OF THE PRIOR ART

Turbine wheel meters with a turbine wheel embodied as an impeller in a flow channel for liquid, namely drinking water, are known from the prior art. For example, EP0512325A2 discloses a single-stream or multi-stream impeller meter in which the turbine wheel is provided with blades, which are curved and taper to a point at the end face of the turbine wheel. The purpose of this is to give the impeller of the turbine wheel meter a reduced starting value and thus a higher sensitivity of the measuring device, which cooperates with the turbine wheel to measure the flow rate of the liquid.

It is also known, for example, to reduce the starting value of a single-stream wheel meter equipped with a nozzle upstream of the impeller with the radial blades (DE 0669520 A1).

All of these design measures for increasing the measurement sensitivity, however, require an increased pressure drop or loss at the turbine wheel meter.

SUMMARY OF THE INVENTION

The object of the invention is to modify the design of a turbine wheel meter of the type described at the beginning in such a way that despite the comparatively higher measurement sensitivity, there is a relatively low pressure loss. In addition, the turbine wheel meter in this case should be simply designed and have a high durability.

If the turbine is embodied as a radial turbine, it is possible to simplify the design in the region of the turbine wheel in comparison to an impeller of an impeller meter or an axial turbine of a Woltmann meter. Specifically, the blades of a radial turbine can be connected to the turbine wheel base of the turbine wheel axial over a comparatively long distance, which can not only simplify the production of the turbine wheel, but can also—due to an increased durability—allow a comparatively slim design at the turbine wheel with improved ease of motion. The radial turbine according to the invention can therefore also result in an increased measurement sensitivity of the turbine wheel meter.

In particular, however, the radial turbine according to the invention can also excel if it is embodied with single-curved blades on the—for example closed—turbine wheel. This can further improve the slim design of the radial turbine, which in connection with the—comparatively short—design that is known from radial turbines, enables low inertial forces and can result in a sensitive response of the turbine wheel. The turbine wheel meter according to the invention with a comparatively slim and short design can therefore provide a high measurement sensitivity even with a flow resistance that is low and constant over the speed range.

According to the invention, it is thus possible to achieve an optimum balance between opposing parameters, namely pressure loss and measurement sensitivity. Consequently, the turbine wheel meter is particularly suitable for measuring the flow rate of a liquid, namely water, in particular drinking water.

If the turbine is embodied as a radial turbine with single-curved blades on the closed turbine wheel, then because of the closed turbine wheel, it is additionally possible to promote a sensitive response through a reduced axial thrust on the axial bearing of the turbine wheel or impeller, which is conducive to the ease of motion of the turbine wheel and thus results in a low starting value. In addition, because of the closed turbine wheel, there is also a reduction in edge losses that occur at the surfaces on the housing adjacent to the flow. This is particularly due to the fact that in the closed turbine wheel, no relative motion takes place between the turbine wheel base and the front cover plate, which makes it possible to constantly ensure a low flow resistance over the entire speed range of the turbine.

Taking into account the comparatively low pressure losses in the radial turbine, the flow resistance due to the turbine wheel can be further reduced if the blades extend with a forward curve at their leading edges. This makes it possible to further reduce the pressure loss of the turbine wheel meter. It is thus also possible to increase the reaction speed of the turbine wheel meter. At the same time, it is generally conceivable for the blades—at least at their leading edges—to extend in a curved fashion toward the rotation direction in which the turbine wheel rotates during operation. The turbine wheel according to the invention with blades that are curved forward in the rotation direction can therefore come to a stop comparatively quickly, which can further increase the measurement precision of the turbine wheel meter.

The flow resistance of the turbine wheel can also be further reduced if the blade passages of the turbine wheel, which are formed between two adjacent blades, are embodied as diverging, viewed in the flow direction. It is thus possible to further reduce the pressure loss of the turbine wheel meter.

The losses due to friction effects, for example a flow separation at a trailing edge of the blades of the radial turbine, can be reduced if the leading edge and/or the trailing edge of the blades extend in a curved shape, in particular an arc shape. Above all, an arc shape can excel in further reducing the flow resistance of the turbine wheel and thus reducing the pressure loss of the turbine wheel meter.

The loss coefficient at the turbine wheel can be additionally reduced if the blade contour of the blade is embodied as asymmetrical to its camber line. It is thus possible to reduce an increase in the flow resistance of the turbine over its speed range—which contributes to ensuring a constantly low pressure loss at the turbine wheel.

If the blades of the turbine wheel have a sickle-shaped blade contour in the plan view, it is possible to further reduce losses at the turbine wheel. In particular, this makes it possible to eliminate pressure surges occurring perpendicular to the flow direction—which can result in a comparatively smooth running and thus in particularly precise measurement results in the measuring device and/or a sensor.

Preferably, the pressure edge and the suction edge of the blade can extend in a curved shape since in this way, geometry-induced flow separations can be avoided and thus blading losses can be kept to a minimum. It is therefore possible to further reduce the flow resistance due to the radial turbine and thus the pressure loss of the turbine wheel meter.

Preferably, the curvature of the pressure edge of the blade can be smaller than the curvature of the suction edge of the blade, which can make it possible to achieve a flow channel that has almost no tapering between the leading and trailing edge. The radial turbine according to the invention can thus ensure a particularly low pressure loss.

If the blades end before the suction opening of the turbine, it is possible for example to reduce the flow retardation at the trailing edge—which can reduce disadvantageous effects on the profile pressure distribution. It is therefore not necessary to accept an increased flow resistance in the radial turbine.

The start-up sensitivity of the radial turbine—potentially with a slightly higher pressure loss—can be increased if the rotation axis of the radial turbine extends in an inclined fashion, in particular normally, relative to the flow direction at the inlet and outlet of the turbine wheel meter.

The deflection of the flow toward the turbine wheel can be achieved in a particularly simply designed way by having the inlet-side flow channel be connected to the turbine wheel via a deflection.

By not providing, for example, a spiral housing upstream of the turbine wheel, it is also possible for the rotation axis of the radial turbine to extend in the direction of the flow directions of the inlet and outlet of the turbine wheel meter. In this way, it is also possible to also achieve a particularly compact design, for example by means of a nearly flush positioning of the radial turbine between the inlet and/or outlet of the turbine wheel meter.

A compact design for a low flow resistance due to the radial turbine can be achieved if the turbine wheel base of the turbine wheel extends in a conical fashion.

Preferably, with an open turbine wheel, the deflection constitutes the front cover plate of the turbine wheel, which makes it possible to simplify the design of the turbine wheel meter even further.

BRIEF DESCRIPTION OF THE DRAWINGS

The subject of the invention is shown in greater detail in the figures in examples based on embodiment variants. In the drawings.

WAYS TO IMPLEMENT THE INVENTION

Figure 1:
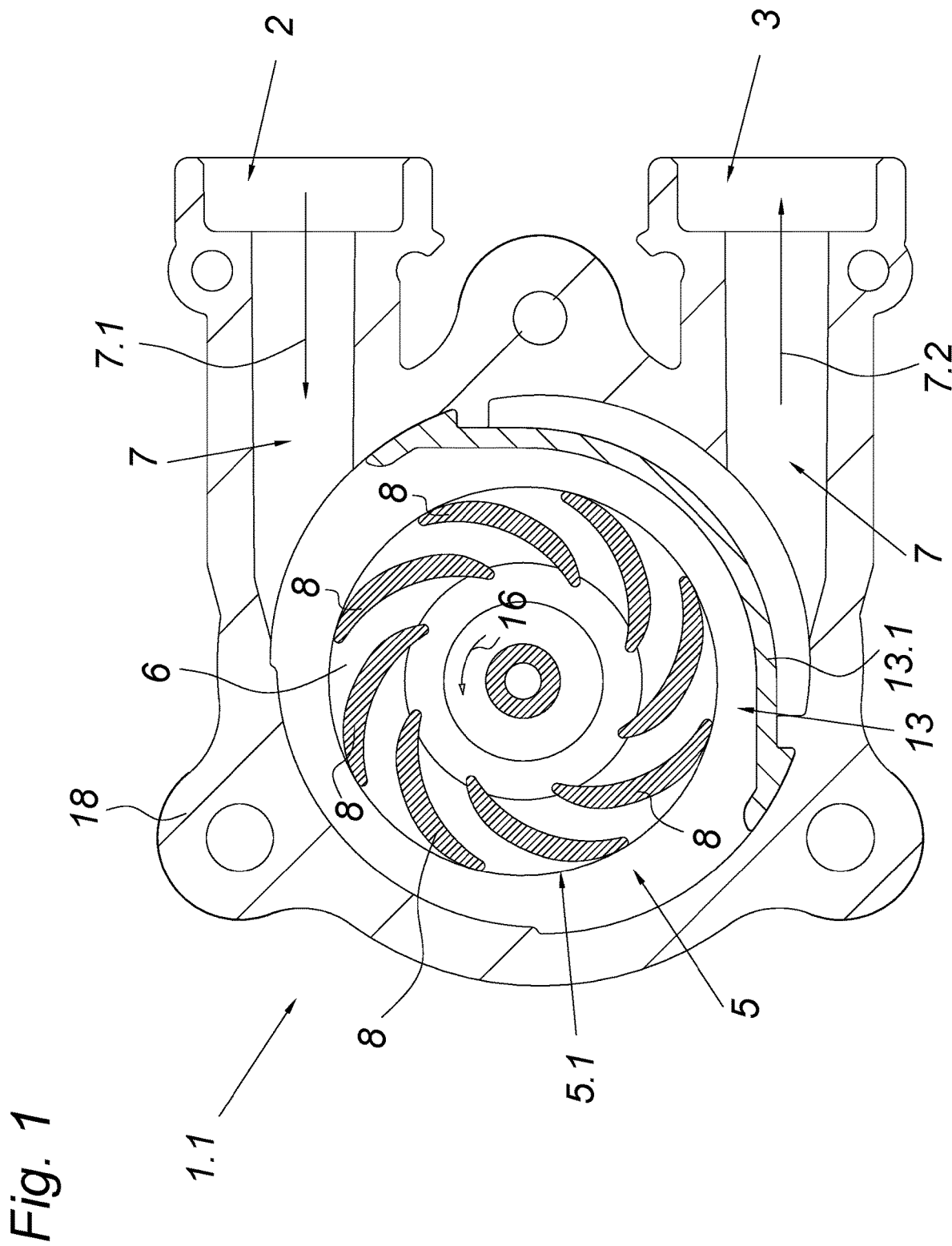
FIG. 1 shows a cut-away top view of a turbine wheel meter according to a first exemplary embodiment.

By way of example, FIG. 1 shows a turbine wheel meter 1.1 according to a first exemplary embodiment. The turbine wheel meter 1.1 is used for measuring the flow rate of a liquid, namely drinking water, which liquid can flow in via an inlet 2 of the turbine wheel meter 1.1 and can flow out via its outlet 3. The housing 18 of the turbine wheel meter 1.1 is composed of two parts, as can be seen in FIG. 2.

Figure 2:
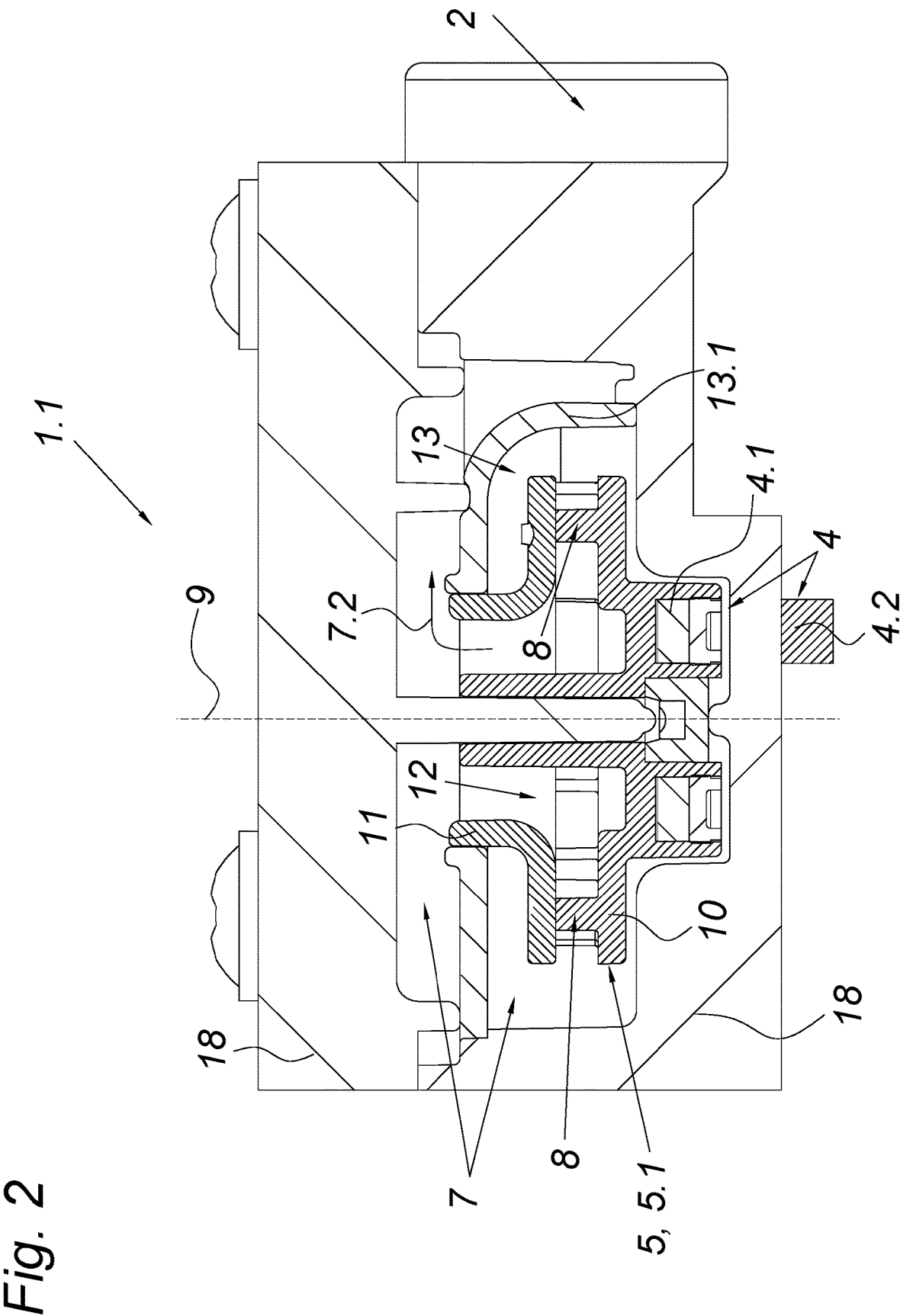
FIG. 2 shows a side view of the turbine wheel meter from FIG. 1.

For measuring flow rate, the turbine wheel meter 1.1 has a measuring device 4, which functions in accordance with the physical principle of electromagnetic induction, for example, with which it is possible to detect the passage of a rotating permanent magnet 4.1 on the turbine wheel meter 1.2 functioning as a rotary position transducer in a measuring coil 4.2, thus enabling a counting—which is visible in FIG. 2. Based on the counting result, a conclusion can be drawn as to the flow rate. The evaluation of the measurement result and the counting do not necessarily have to be provided at the turbine wheel meter 1.2. The measuring device 4, which is at least embodied as a sensor (permanent magnet/measuring coil) on the turbine wheel meter 12, can also have other sensors in order to cooperate with the turbine wheel 6 to measure the flow rate of the liquid.

To produce this measurable rotating movement, the turbine wheel meter 1.1 is associated with a turbine 5 whose turbine wheel 6 is positioned in the flow channel 7 of the turbine wheel meter 1.1 between the inlet 2 and outlet 3. The flow direction 7.1 of the liquid in the flow channel 7 is indicated in FIG. 1. The flow passes through the closed turbine wheel 6 centripetally, i.e. from outside to inside.

The turbine wheel 6 has a plurality of curved blades 8, which cause the turbine wheel 6 to rotate as a function of the flow rate. The permanent magnet 4.1 is fastened to the turbine wheel 6 as a result of which the turbine wheel 6 cooperates with the measuring device 4 to measure the flow rate of the liquid.

In order to ensure a high measurement sensitivity with a comparatively low pressure loss due to the turbine wheel 6, the turbine 5 is embodied as a radial turbine 5.1. In this case, the liquid flows radially relative to the rotation axis 9 of the turbine wheel 6 and then flows from the turbine wheel 6 axially. The radial turbine 5.1 is embodied as a single-stage turbine 5, as can be seen in FIG. 2.

In addition, the radial turbine 5.1 according to the invention has single-curved blades 8 on the turbine wheel 6—which means that the inflow angle ß1 and outflow angle ß2, as is visible in the top view, are equal at the turbine wheel base 10 (also often referred to as the back cover plate) and at the front cover plate 11 of the radial turbine 5.1. This reduces the flow resistance due to the radial turbine 5.1 and also ensures a short and slim design at the turbine wheel 6. This achieves a freely moving turbine wheel 6.

In addition, the turbine wheel 6 is embodied with the front cover plate 11 closed, which reduces clearance losses and thus ensures a rapid start-up even at low flow rates.

Figure 3:
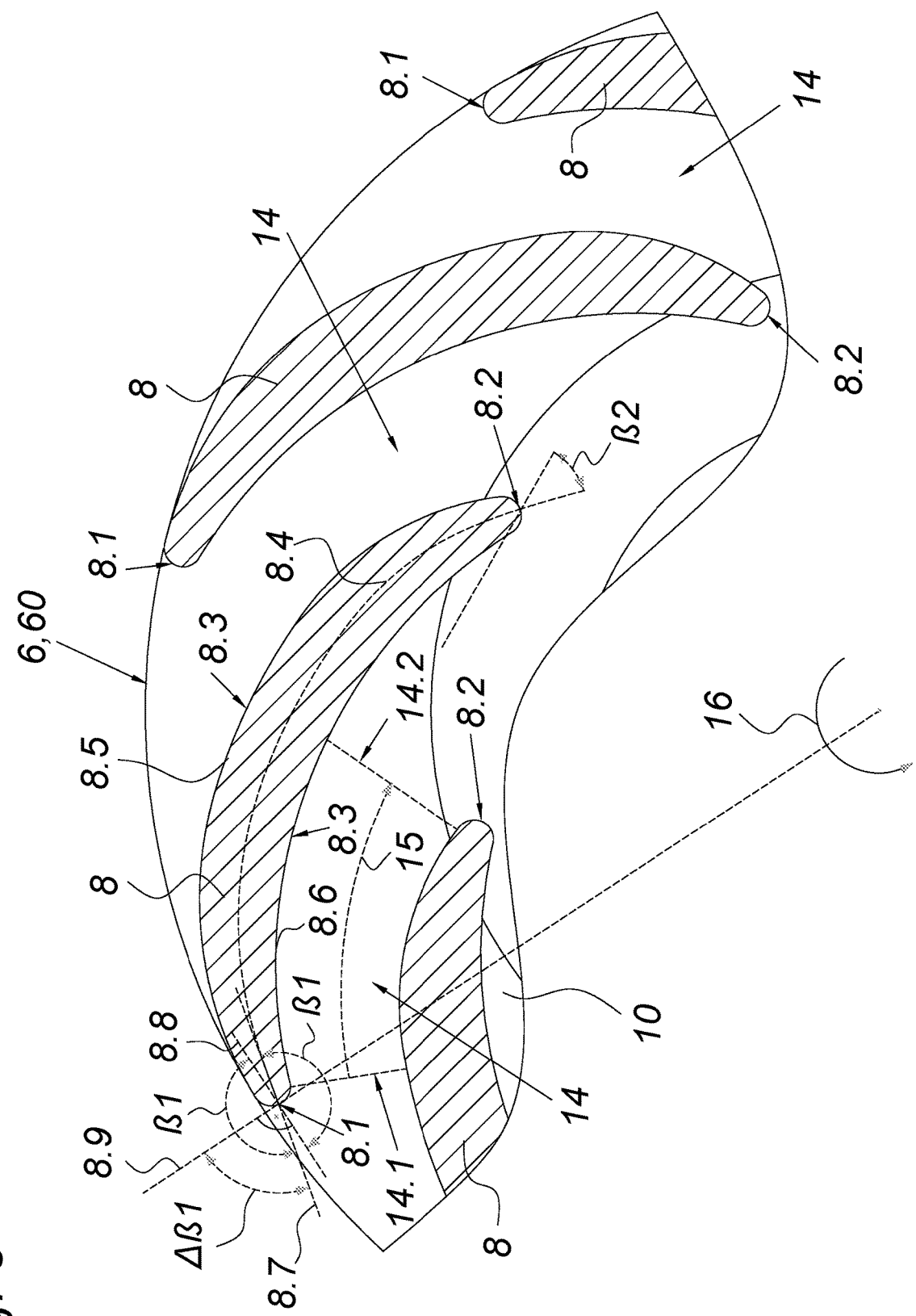
FIG. 3 shows an enlarged partial view of a turbine wheel of a turbine wheel meter according to FIG. 1, FIG. 4, FIG. 5, or FIG. 7.

As is particularly clear from FIG. 3, at the leading edge 8.1 of the turbine wheels 6, 60, the blades 8 extend with a forward curve (ß1>90 degrees). By means of these blades 8, which are curved forward in the rotation direction 16, the pressure loss of the radial turbine 5.1 is further reduced, accompanied by a reduced efficiency.

As is also clear from FIG. 3, the blade leading edge angle ß1 is enclosed between the leading edge tangent 8.7 and the circumference tangent 8.8 of the blade 8. The forward curvature $\Delta\beta1$ relates to the angle at which the blade 8 is inclined relative to a radial span—indicated by means of a dashed line 8.9—with respect to its leading edge tangent 8.7.

The profile losses at the blades 8 are also reduced by the curved leading edge 8.1 and curved trailing edge 8.2—as is clear from the detail view in FIG. 3. The curved shape is an arc shape with a comparatively large radius. This forms a relatively thick front and rear edge of the profile, which homogenizes the pressure distribution in this region and further reduces profile losses.

It is also clear from FIG. 3 that the blade contour 8.3 of the blade 8 is embodied as asymmetrical to its camber line 8.4—specifically in that the blades 8 have a sickle-shaped blade contour 8.3 in the plan view. This further reduces the pressure loss due to the radial turbine 5.1 and also ensures a low starting value at the turbine wheel 6.

As is also clear from FIG. 3, the pressure edge 8.5 and suction edge 8.6 of the blades 8 extend in a curved shape, with the curvature of the pressure edge 8.5 of the blades 8 being smaller than the curvature of the suction edge 8.6 of the blades 8.

In addition, the blades 8 end before the suction opening 12 of the turbine 5, which makes it possible to achieve a compactly embodied turbine wheel meter 1.1, which is characterized by a comparatively low pressure loss.

According to a first embodiment variant shown in FIGS. 1 to 3, the rotation axis 9 of the radial turbine 5.1 extends in an inclined fashion, namely normally, relative to the flow direction 7.2 at the outlet 3 and in the example shown, also at the inlet 2 of the turbine wheel meter 1.1. This increases the pressure loss marginally, but advantageously reduces the starting value of the turbine wheel 6.

In order to deflect the inlet-side flow channel 7, a deflection 13 is provided, which has a deflecting part 13.1 in the flow channel 7.

Figure 4:
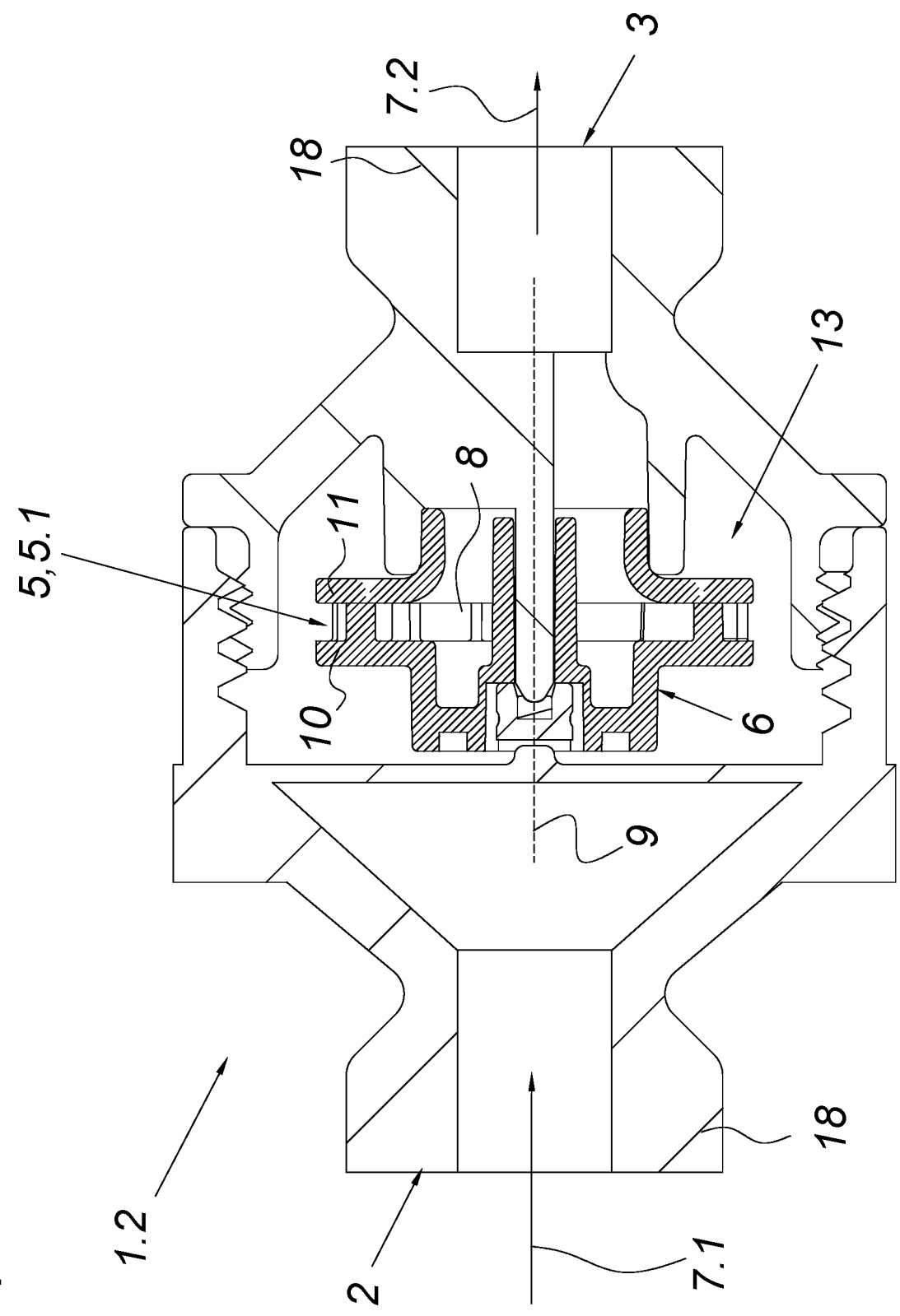
FIG. 4 shows a cut-away side view of a turbine wheel meter according to a second exemplary embodiment.

In FIG. 4, another turbine wheel meter 1.2 is depicted as a second exemplary embodiment. This second turbine wheel meter 1.2 differs from the first turbine wheel meter 1.1 shown in FIGS. 1 and 2 in the positioning of the rotation axis 9 of the radial turbine 5.1 parallel to the tube axis with the inlet 2 and outlet 3. The rotation axis 9 of the radial turbine 5.1 of the second turbine wheel meter 1.2 thus extends in the direction of the flow directions 7.1, 7.2 at the inlet and outlet 2, 3 of the turbine wheel meter 1.2. It is thus possible to simplify the design in the region of the deflection 13 since the deflecting part 13.1 that is known from FIG. 2 is omitted. This design at the turbine wheel meter 1.2 further increases the measurement sensitivity.

All of the blade passages 14 of the turbine wheel 8, which are formed between two adjacent blades 8, are embodied as diverging from each other, viewed in the flow direction 15. This results in a comparatively low pressure loss at the turbine wheel. Viewed from the respective inlet 14.1 of the blade passages 14, the blade passages 14 diverge slightly, i.e. are embodied as spaced an almost constant distance apart from each other, with the divergence increasing toward the outlet 14.2 of the blade passages.

Figure 5:
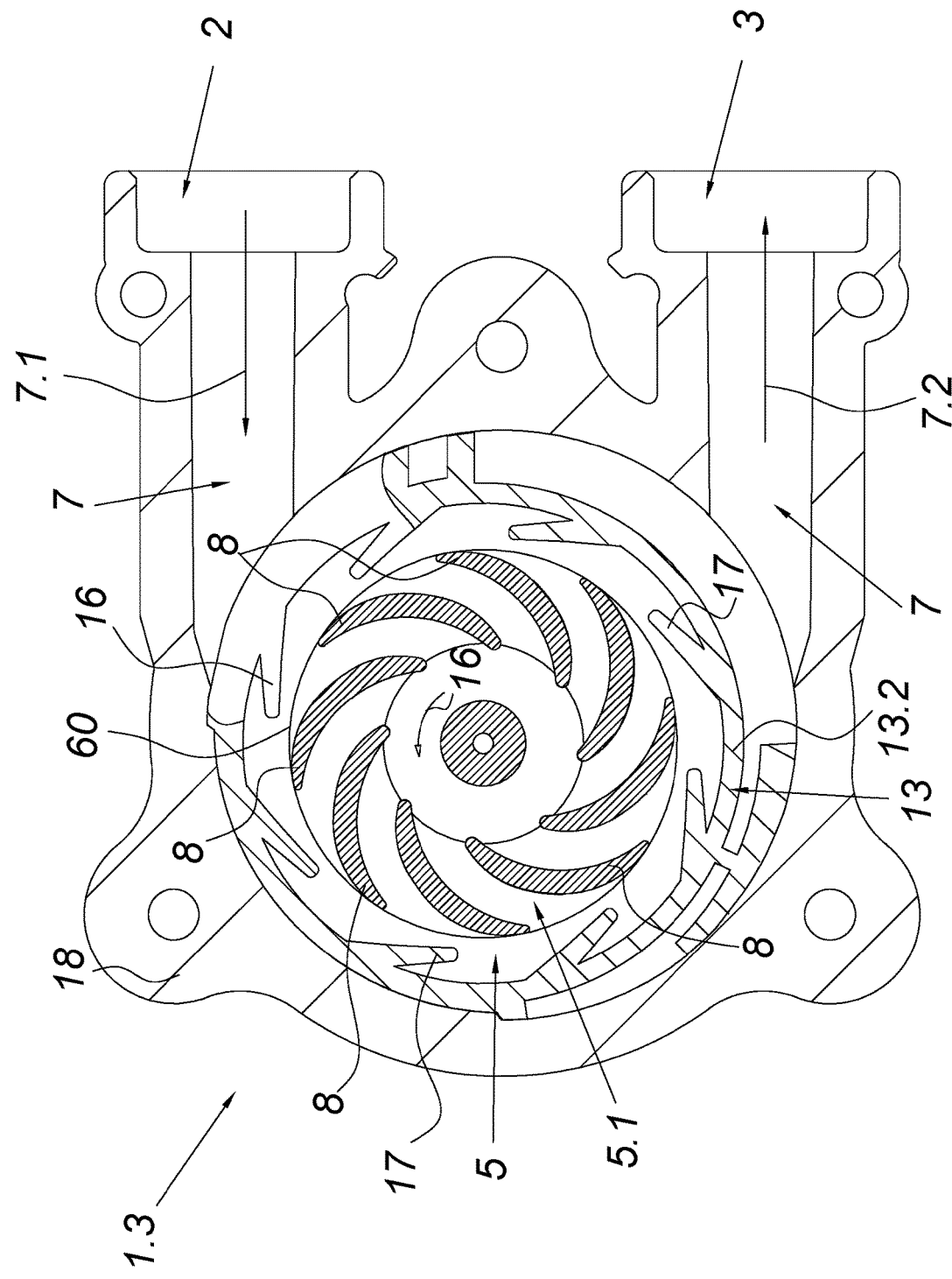
FIG. 5 shows a cut-away top view of a turbine wheel meter according to a third exemplary embodiment and FIG. 6 shows a side view of the turbine wheel meter from FIG. 5.

In FIG. 5, another turbine wheel meter 1.3 is depicted as a third exemplary embodiment. This third turbine wheel meter 1.3 differs from the first turbine wheel meter 1.1 essentially by virtue of its open turbine wheel 60. Consequently, a relative movement between the turbine wheel base 10 and the front cover plate 11 takes place in the turbine wheel 60. The features relating to the blades 8 of the turbine wheel 60 are the same as those of the turbine wheel 6 according to FIG. 1, which features are visible in the detail view in FIG. 3.

The turbine wheel meter 1.3 also has a differently embodied deflection 13—in fact, this deflecting part 13.2 is provided with guide blades 17, which like a guiding wheel, deflect the flow onto the turbine wheel 60 or more specifically, its blades 8. The deflecting part 13.2 also constitutes the front cover plate 11 of the turbine wheel 60, which simplifies the design to a particular degree.

Figure 6:
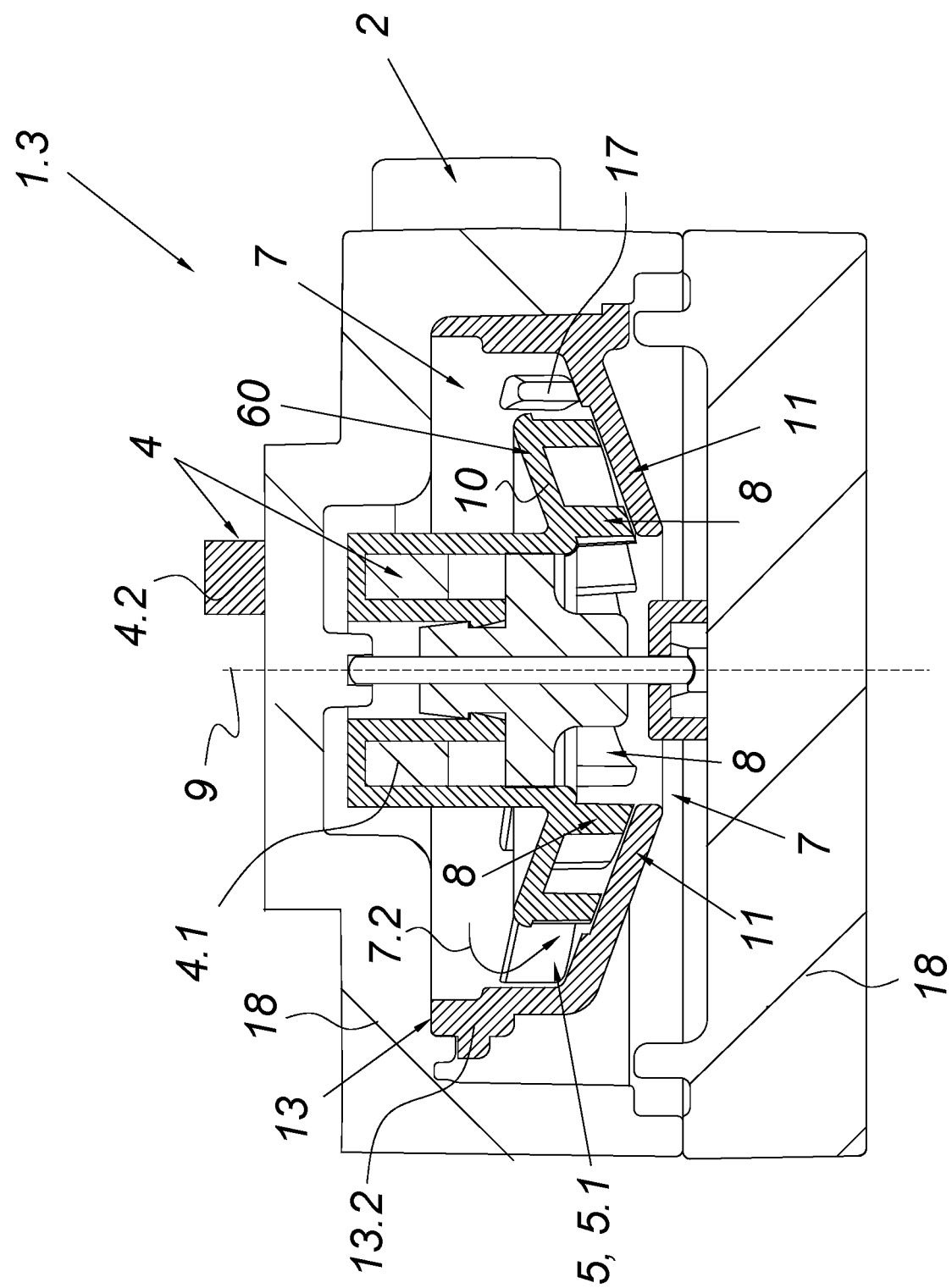

As is also clear from FIG. 6, the turbine wheel base 10 of the turbine wheel 60 extends in a conical fashion, which further reduces the flow resistance due to the radial turbine 5.1.

Figure 7:
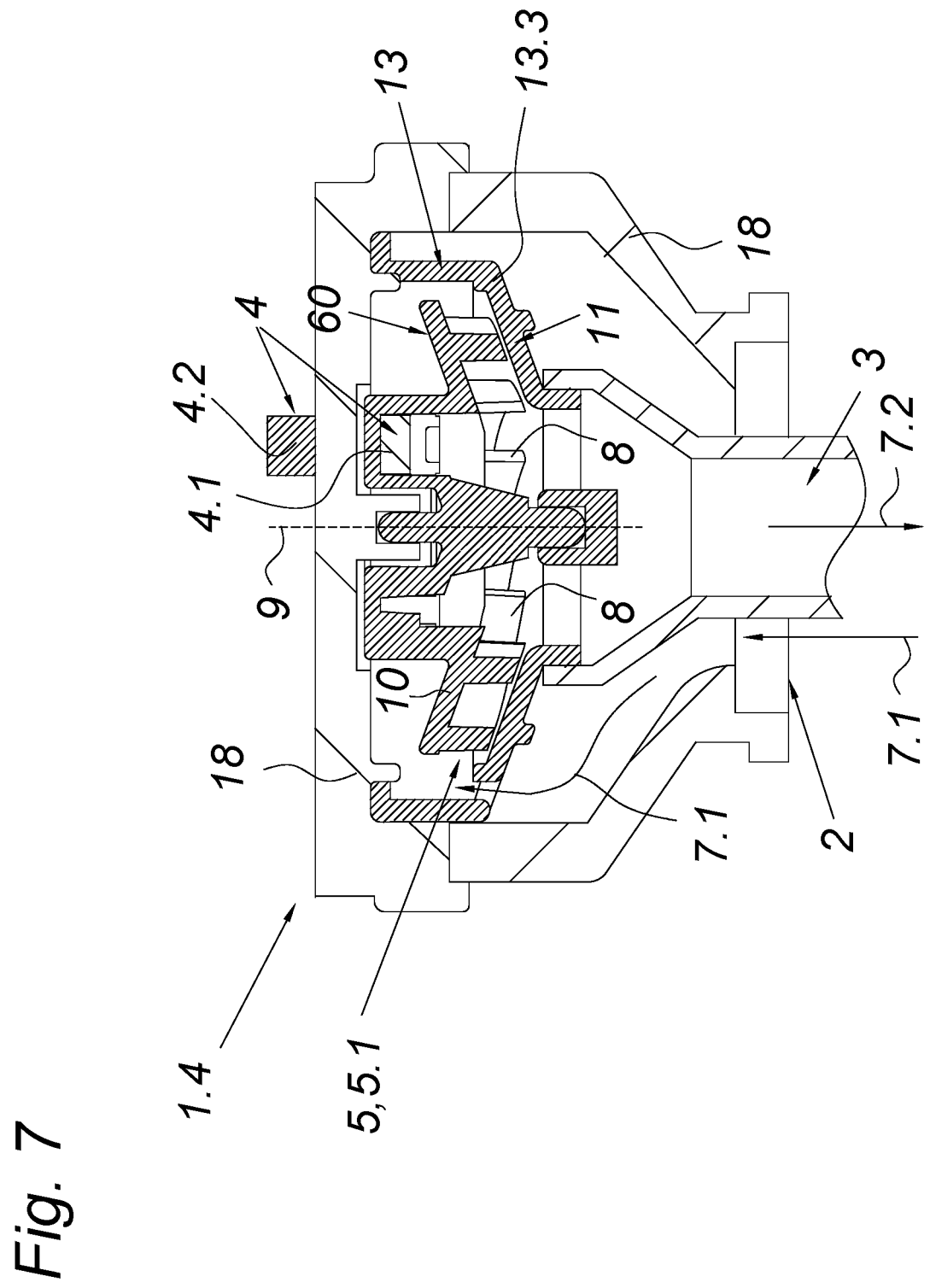
FIG. 7 shows a cut-away side view of a turbine wheel meter according to a fourth exemplary embodiment.

According to FIG. 7, another turbine wheel meter 1.4 is depicted as a fourth exemplary embodiment. This fourth turbine wheel meter 1.4 differs from the second turbine wheel meter 1.2 essentially by virtue of its open turbine wheel 60.

Consequently, a relative movement between the turbine wheel base 10 and the front cover plate 11 takes place in the turbine wheel 60. The features relating to the blades 8 of the turbine wheel 60 are the same as those of the turbine wheel 6 according to FIG. 1, which features are visible in the detail view in FIG. 3.

As is also clear from FIG. 7, the turbine wheel base 10 of the turbine wheel 60 extends in a conical fashion, which further reduces the flow resistance due to the radial turbine 5.1. The fourth turbine wheel meter 1.4 also has a deflection 13 with a deflecting part 13.3, which constitutes the front cover plate 11.

The invention claimed is:

1. A turbine wheel meter for measuring a flow rate of a liquid, comprising:
    a measuring device;
    an inlet and an outlet for the liquid to be measured;
    a flow channel provided between the inlet and the outlet; and
    a turbine that is a radial turbine having a turbine wheel with single-curved blades positioned in the flow channel,
    wherein the turbine wheel cooperates with the measuring device to measure the flow rate of the liquid,
    wherein the single-curved blades extend with a forward curve towards leading edges in a rotation direction of the turbine wheel, and
    wherein the turbine wheel is closed with the single-curved blades being arranged between a turbine wheel base and a co-rotating front cover plate.

2. The turbine wheel meter according to claim 1, wherein blade passages of the turbine wheel, which are formed between two adjacent blades, are embodied as diverging, viewed in a flow direction.

3. The turbine wheel meter according to claim 1, wherein a leading edge and/or a trailing edge of each of the blades extend in a curved shape.

4. The turbine wheel meter according to claim 3, wherein the leading edge and/or the trailing edge of each of the blades extend in an arc shape.

5. The turbine wheel meter according to claim 1, wherein a blade contour of each of the blades is asymmetrical to a camber line of a respective blade.

6. The turbine wheel meter according to claim 1, wherein the blades of the turbine wheel have a sickle-shaped blade contour in a plan view.

7. The turbine wheel meter according to claim 1, wherein a pressure edge and a suction edge of each of the blades extend in a curved shape.

8. The turbine wheel meter according to claim 1, wherein a curvature of a pressure edge of each of the blades is smaller than a curvature of a suction edge of each of the blades.

9. The turbine wheel meter according to claim 1, wherein each of the blades end before a suction opening of the turbine.

10. The turbine wheel meter according to claim 1, wherein a rotation axis of the radial turbine extends in an inclined fashion relative to a flow direction at the outlet and/or at the inlet of the turbine wheel meter.

11. The turbine wheel meter according to claim 10, wherein the rotation axis of the radial turbine extends normally to the flow direction at the outlet and/or at the inlet of the turbine wheel meter.

12. The turbine wheel meter according to claim 1, wherein an inlet-side flow channel is connected to the turbine wheel via a deflection.

13. The turbine wheel meter according to claim 1, wherein a rotation axis of the radial turbine extends in a direction of flow directions at the inlet and/or the outlet of the turbine wheel meter.

14. A turbine wheel meter for measuring a flow rate of a liquid, comprising:
- a measuring device;
- an inlet and an outlet for the liquid to be measured;
- a flow channel provided between the inlet and the outlet and
- a turbine that is a radial turbine having a turbine wheel with single-curved blades positioned in the flow channel,
- wherein the turbine wheel cooperates with the measuring device to measure the flow rate of the liquid,
- wherein the single-curved blades extend with a forward curve towards leading edges in a rotation direction of the turbine wheel,
- wherein a turbine wheel base of the turbine wheel extends in a conical fashion, and
- wherein a portion of a front cover plate extends in a conical fashion parallel to the wheel base.

15. A turbine wheel meter for measuring a flow rate of a liquid, comprising:
- a measuring device;
- an inlet and an outlet for the liquid to be measured;
- a flow channel provided between the inlet and the outlet; and
- a turbine that is a radial turbine having a turbine wheel with single-curved blades positioned in the flow channel,
- wherein the turbine wheel cooperates with the measuring device to measure the flow rate of the liquid,
- wherein the single-curved blades extend with a forward curve towards leading edges in a rotation direction of the turbine wheel,
- wherein an inlet-side flow channel is connected to the turbine wheel via a deflection,
- wherein the turbine wheel is open, and
- wherein the deflection constitutes a front cover plate of the turbine wheel, the single-curved blades being arranged between a turbine wheel base and the front cover plate.

\* \* \* \* \*